UNITED STATES PATENT OFFICE.

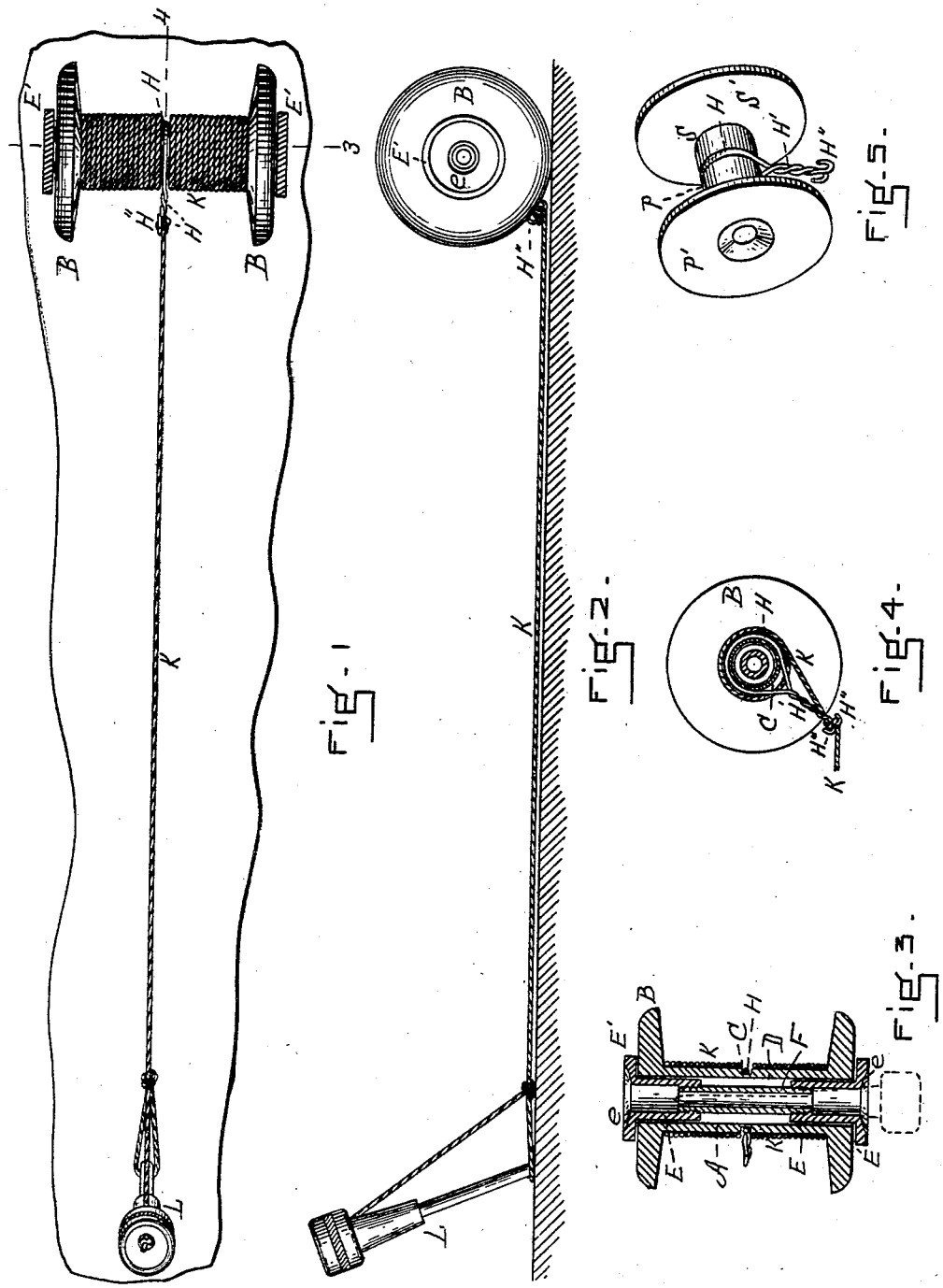

SAMUEL W. WILCOX, OF MENDON, MASSACHUSETTS.

REEL FOR CHALK-LINES, PLUMB-BOBS, &c.

SPECIFICATION forming part of Letters Patent No. 625,484, dated May 23, 1899.

Application filed March 7, 1899. Serial No. 708,082. (No model.)

*To all whom it may concern:*

Be it known that I, SAMUEL W. WILCOX, a citizen of the United States, residing in Mendon, in the county of Worcester and State of Massachusetts, have invented a new and useful Improvement in Reels for Chalk-Lines, Plumb-Bobs, &c., of which the following is a specification.

This improvement relates to reels adapted particularly for reeling and unreeling chalk-lines, although it may be applied to plumb-bob reels and possibly to reels used in some other connections. As applied to chalk-line reels the invention consits in an attachment applied directly to the barrel of the reel, said attachment being of such a nature that after the awl has been placed in position the chalk-line can be made taught by catching or winding it upon said attachment, and thus preventing the reel from rotating and unwinding the line further.

The nature of my invention is fully descibed in detail below and illustrated in the accompanying drawings, in which—

Figure 1 is a plan showing my improved chalk-line reel in position and in use. Fig. 2 is a side elevation of the same. Fig. 3 is a section taken on line 3, Fig. 1, dotted lines showing the position of the awl when not in use. Fig. 4 is a section taken on line 4, Fig. 1. Fig. 5 is a perspective view of a plumb-bob reel with my invention applied thereto.

Similar letters of reference indicate corresponding parts.

A represents the barrel, and B the flanges, of a reel. The barrel is provided substantially centrally with an annular groove C. Within the hole or passage D in this barrel are tubular thimbles E, the diameters of which are small enough to allow the reel to rotate upon them, each of said thimbles being provided with a flange E', overlapping the outer surfaces of the flanges B of the reel, as shown in Fig. 3. These flanges E' are recessed or concaved, as shown at e, to receive the thumb and finger of the operator. The inner ends of the thimbles E are internally screw-threaded and connected by the tube F, which screws into them.

The portion H of a wire is laid within the groove C, conforming in shape to the reel, and is held friction-tight within said groove by means of the portions H', such portions being twisted around each other. The ends of the wire terminate in rearwardly-bent hooks H''. K represents the chalk-line wound around the reel in the ordinary manner and provided at its outer end with the usual awl L, constructed as usual.

In practical operation the awl L is placed in position, as indicated in Figs. 1 and 2, and the chalk-line K unwound by pressing the thumb and a finger of one hand against the outer surfaces e of the flange E' of the thimbles E and allowing the reel to be rotated on said thimbles by the line. When the desired length of line has been unwound, the unwound portion next the barrel is caught over the hooks H'' in any suitable manner, so that it cannot slip, thus preventing any more of the line from being unwound from the reel. The line or cord being thus held firmly at each end, the reel is lowered to the floor and the cord snapped in the ordinary manner.

In applying my invention to a plumb-bob reel, as indicated in Fig. 5, the reel consists simply of a pair of barrels or thimbles P and S, provided with the flanges P' and S', one thimble being screwed into the other and one being provided with a groove exactly similar to the groove C, by means of which the appliance H H' H'' is secured. Of course in using this reel the flanges slip between the finger and thumb until the cord has been caught around the hook.

Having thus fully described my invention, what I claim, and desire to secure by Letters Patent, is—

1. In a reel for chalk-lines, plumb-bobs, &c., the barrel provided with the annular groove C; and the engaging device consisting of the portion H set within the groove and conforming substantially in shape thereto and the portion H' extending from said portion H and from the barrel between the coils of line on said barrel and terminating at its outer end in an engaging hook, substantially as and for the purpose set forth.

2. In a reel of the character described, the combination with the barrel and line or cord wound thereon; of an engaging device extending from said barrel out between the layers of said line or cord, and adapted to hold said line and prevent it from unwinding further when such line is caught upon the engaging device, substantially as and for the purpose set forth.

3. In a chalk-line reel, the barrel A provided with the flanges B and annular goove C; the thimbles E, E' extending into the hole in the barrel from opposite ends thereof; the tube F connecting the inner ends of said thimbles within the barrel; a cord wound around the barrel; and the engaging device comprising a wire consisting of the portion H laid within said groove, the twisted portion H' extending from said portion H out between the coils of cord, and the hooks H'' at the outer end of said portion H, substantially as described.

SAMUEL W. WILCOX.

Witnesses:
 JAMES H. BURNS,
 JAMES J. FULLIUM.